US011835934B2

(12) United States Patent
Bjork (10) Patent No.: US 11,835,934 B2
(45) Date of Patent: Dec. 5, 2023

(54) SYSTEMS AND METHODS FOR REDUCING VIBRATIONAL DISTURBANCES

(71) Applicant: Nikon Corporation, Tokyo (JP)

(72) Inventor: Matthew Parker-McCormick Bjork, Davis, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 17/496,482

(22) Filed: Oct. 7, 2021

(65) Prior Publication Data

US 2022/0113696 A1 Apr. 14, 2022

Related U.S. Application Data

(60) Provisional application No. 63/089,808, filed on Oct. 9, 2020.

(51) Int. Cl.
  *G05B 19/404* (2006.01)
(52) U.S. Cl.
  CPC .. *G05B 19/404* (2013.01); *G05B 2219/39199* (2013.01); *G05B 2219/49048* (2013.01)
(58) Field of Classification Search
  None
  See application file for complete search history.

(56) References Cited

U.S. PATENT DOCUMENTS

| | | |
|---|---|---|
| 6,523,695 B1 | 2/2003 | Ueta et al. |
| 6,590,639 B1 | 7/2003 | Yuan et al. |
| 6,758,313 B2 | 7/2004 | Binnard |
| 6,953,109 B2 | 10/2005 | Watson et al. |
| 6,987,559 B2 | 1/2006 | Phillips et al. |
| 7,095,482 B2 | 8/2006 | Phillips et al. |
| 7,726,452 B2 | 6/2010 | Kraner |
| 2013/0328253 A1* | 12/2013 | Kraner ............... F16F 15/002 267/140.14 |
| 2021/0046654 A1* | 2/2021 | Knott .................... B25J 9/1602 |

* cited by examiner

*Primary Examiner* — Ryan A Jarrett
(74) *Attorney, Agent, or Firm* — InventIQ Legal LLP; Anna M. Ison; Daniel J. Kennedy (57) ABSTRACT

The problem of addressing vibrational disturbances in mechanical positioning systems is addressed by systems and methods that use a combination of active vibration dampening and passive vibration dampening. A system described herein generally comprises a mechanical positioning system; a payload; and a vibration dampening module coupled to the mechanical position system and to the payload. The vibration dampening module generally comprises an active vibration dampener and/or a passive vibration dampener.

20 Claims, 5 Drawing Sheets

SYSTEMS AND METHODS FOR REDUCING VIBRATIONAL DISTURBANCES

CROSS REFERENCE TO OTHER APPLICATIONS

This application claims priority to U.S. Provisional Patent Application No. 63/089,808, entitled SYSTEMS AND METHODS FOR REDUCING VIBRATIONAL DISTURBANCES, filed Oct. 9, 2020, which is incorporated herein by reference for all purposes.

BACKGROUND OF THE INVENTION

Mechanical positioning systems such as robotic positioning systems may be useful for a variety of tasks. However, current mechanical positioning systems are subject to vibrational disturbances that makes them unsuited for tasks requiring accurate and/or precise positioning and/or alignment, such as optical manufacturing or metrology.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "disturbance" shall mean and include any unwanted motion, including steady-state disturbance, short-term disturbance, random disturbance, transient disturbance, and repeatable disturbance.

As used herein, the term "vibration" shall mean and include steady-state vibration, short-term vibration, random vibration, transient vibration, repeatable vibration, and any unwanted vibration.

Mechanical positioning systems such as robotic positioning systems may be useful for a variety of tasks. However, current mechanical positioning systems are subject to vibrational disturbances that makes them unsuited for tasks requiring accurate and/or precise positioning and/or alignment, such as optical manufacturing or metrology.

Accordingly, the problem of reducing vibrational disturbances is addressed by systems and methods that use a combination of active vibration dampening and may include the addition of a passive vibration dampening system.

A system is disclosed herein. The system generally comprises a vibration dampening module comprising at least one of an active vibration dampener and a passive vibration dampener. The vibration dampening module is coupled to a mechanical positioning system and/or to a payload.

In some embodiments, the system comprises a mechanical positioning system and a vibration dampening module. The vibration dampening module comprises at least one of an active vibration dampener and a passive vibration dampener. The vibration dampening module is coupled to the mechanical positioning system and to a payload.

In some embodiments, the system comprises a payload and a vibration dampening module. The vibration dampening module comprises at least one of an active vibration dampener and a passive vibration dampener. The vibration dampening module is coupled to a mechanical positioning system and/or to the payload.

In some embodiments, the system comprises a mechanical positioning system, a payload, and a vibration dampening module coupled to the mechanical positioning system and to the payload. The vibration dampening module comprises at least one of an active vibration dampener and a passive vibration dampener.

In some embodiments, the mechanical positioning system comprises a robotic system. In some embodiments, the robotic system comprises a robotic arm. In some embodiments, the payload comprises an optical system. In some embodiments, the optical system comprises a laser system. In some embodiments, the optical system comprises an optical manufacturing system. In some embodiments, the optical manufacturing system comprises a laser manufacturing system. In some embodiments, the payload comprises a manufacturing system. In some embodiments, the payload comprises a manufacturing system. In some embodiments, the payload comprises a positioning system. In some embodiments, the payload comprises a robotic hand gripper. In some embodiments, the active vibration dampener is configured to dampen vibrations of the payload characterized by a characteristic frequency of 30 Hertz (Hz) to 30 kilohertz (kHz). In some embodiments, the active vibration dampener comprises a piezoelectric actuator. In some embodiments, the piezoelectric actuator comprises one or more members selected from the group consisting of: a one-axis piezoelectric actuator, a two-axis piezoelectric actuator, a three-axis piezoelectric actuator, a four-axis piezoelectric actuator, a five-axis piezoelectric actuator, and a six-axis piezoelectric actuator. In some embodiments, the passive vibration dampener is configured to dampen vibrations of the payload characterized by a characteristic frequency of at most 300 Hz. In some embodiments, the passive vibration dampener comprises an elastomeric material. In some embodiments, the active vibration dampener is coupled to the mechanical positioning system and the passive vibration dampener is coupled to the payload. In some embodiments, the active vibration dampener is coupled to the payload and the passive vibration dampener is coupled to the mechanical positioning system. In some embodiments, the system further comprises: one or more sensors configured to measure one or more dynamical properties associated with at least one of the mechanical positioning system and the payload; and one or more controllers configured to receive the one or more dynamical properties and to direct the active vibration dampener to compensate for vibrations of at least one of the mechanical positioning system and the payload based on the one or more dynamical properties. In some embodiments, the one or more sensors comprise one or more members selected from the group consisting of: position sensors, velocity sensors, accelerometers, force sensors, and torque sensors.

In some embodiments, a system is disclosed comprising a payload and a vibration dampening module comprising at least one of an active vibration dampener and a passive vibration dampener. The vibration dampening module is coupled to a mechanical positioning system/or and to the payload.

In some embodiments, a system is disclosed comprising a mechanical positioning system and a vibration dampening module comprising at least one of an active vibration dampener and a passive vibration dampener. The vibration dampening module is coupled to the mechanical positioning system and to a payload.

In some embodiments, a system is disclosed comprising a mechanical positioning system, a payload, and a vibration dampening module coupled to the mechanical positioning system and to the payload. The vibration dampening module comprises at least one of an active vibration dampener and a passive vibration dampener.

Further disclosed herein is a method comprising: activating a vibration dampening module coupled to a mechanical positioning system and/or to a payload; and using the vibration dampening module to dampen mechanical vibrations of the payload. In some embodiments, the vibration dampening module comprises at least one of an active vibration dampener and a passive vibration dampener. In some embodiments, the mechanical positioning system comprises a robotic system. In some embodiments, the robotic system comprises a robotic arm. In some embodiments, the payload comprises an optical system. In some embodiments, the optical system comprises a laser system. In some embodiments, the optical system comprises an optical manufacturing system. In some embodiments, the optical manufacturing system comprises a laser manufacturing system. In some embodiments, the payload comprises a manufacturing system. In some embodiments, the payload comprises a positioning system. In some embodiments, the payload comprises a robotic hand gripper.

In some embodiments, the method further comprises dampening vibrations of the payload characterized by a characteristic frequency of at most 30 kilohertz (kHz). In some embodiments, the active vibration dampener is used to dampen vibrations of the payload characterized by a characteristic frequency of 30 Hertz (Hz) to 30 kHz. In some embodiments, the active vibration dampener comprises a piezoelectric actuator. In some embodiments, the piezoelectric actuator comprises one or more members selected from the group consisting of: a one-axis piezoelectric actuator, a two-axis piezoelectric actuator, a three-axis piezoelectric actuator, a four-axis piezoelectric actuator, a five-axis piezoelectric actuator, and a six-axis piezoelectric actuator.

In some embodiments, the method further comprises dampening vibrations of the payload characterized by a characteristic frequency of at most 300 Hz. In some embodiments, the passive vibration dampener is used to dampen vibrations of the payload characterized by a characteristic frequency of at most 300 Hz. In some embodiments, the passive vibration dampener comprises an elastomeric material. In some embodiments, the active vibration dampener is coupled to the mechanical positioning system and the passive vibration dampener is coupled to the payload. In some embodiments, the active vibration dampener is coupled to the payload and the passive vibration dampener is coupled to the mechanical positioning system.

In some embodiments, the method further comprises: measuring one or more dynamical properties associated with at least one of the mechanical positioning system and the payload; receiving the one or more dynamical properties; and directing the active vibration dampener to compensate for vibrations of at least one of the mechanical positioning system and the payload based on the one or more dynamical properties. In some embodiments, one or more sensors are used to measure the one or more dynamical properties associated with at least one of the mechanical positioning system and the payload and one or more controllers are used to receive the one or more dynamical properties and direct the active vibration dampener to compensate for vibrations of at least one of the mechanical positioning system and the payload based on the one or more dynamical properties. In some embodiments, the one or more sensors comprise one or more members selected from the group consisting of: position sensors, velocity sensors, accelerometers, force sensors, and torque sensors.

Systems and Methods for Reducing Vibrational Disturbances

Figure 1:
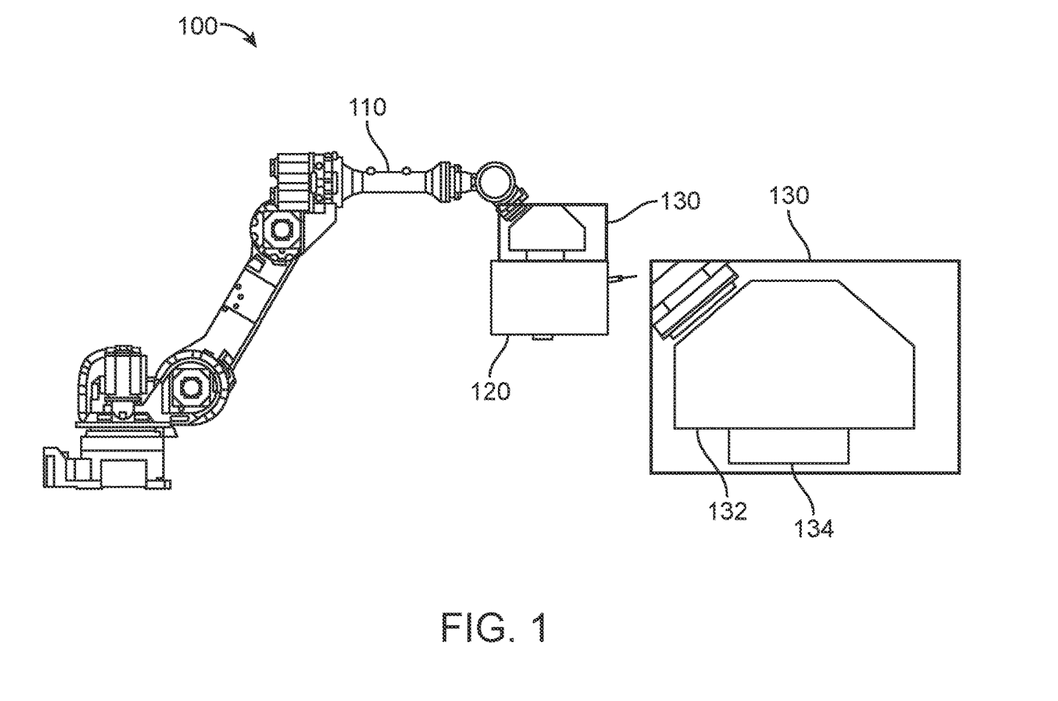
FIG. 1 shows a block diagram of a first embodiment of a system for reducing mechanical disturbances.

FIG. 1 shows a block diagram of a first embodiment of a system 100 for reducing mechanical disturbances. In the example shown, the system 100 comprises a mechanical positioning system 110, a payload 120, and a vibration dampening module 130. In some embodiments, the vibration dampening module is coupled to the mechanical positioning system and to the payload. In some embodiments, the vibration dampening module is mechanically coupled to the mechanical positioning system and to the payload. In some embodiments, the vibration dampening module is detachably coupled to the mechanical positioning system and to the payload. In some embodiments, the vibration dampening module is integrally coupled to the mechanical positioning system and to the payload.

In some embodiments, the mechanical positioning system comprises a robotic system, such as a robotic arm. In some embodiments, the mechanical positioning system comprises one or more rigid links, one or more joints, and/or one or more link actuators. In some embodiments, the links are connected by joints that allow for either rotational motion or translational movement, and the link actuators are controlled to rotationally and/or translationally move the links. In some embodiments, each link actuator includes one or more linear actuators and/or one or more rotational actuators. In one implementation, the distal end of the mechanical positioning system includes a connector frame that provides a rigid structure for supporting the vibration dampening module, connecting the vibration dampening module to the mechanical positioning system, and roughly positioning the vibration damping module for vibration dampening of the payload. The size, shape, and/or design of the connector frame can be varied according to the design of the vibration dampening module and the payload. In some embodiments, the mechanical positioning system is susceptible to positioning or alignment errors due to vibrational or other environmental disturbances.

In some embodiments, the payload comprises a manufacturing system. In some embodiments, the manufacturing system comprises one or more of a machining system, joining system, or additive manufacturing system. In some embodiments, the manufacturing system comprises one or more of a milling system, turning system, lathing system, facing system, boring system, knurling system, drilling system, reaming system, countersinking system, tapping system, sawing system, broaching system, planning system, cutting system, abrasive jet machining system, water jet cutting system, photochemical machining system, honing system, electro-chemical grinding system, finishing system, buffing system, burnishing system, routing system, hobbing system, ultrasonic machining system, electrical discharge machining system, electron beam machining system, laser cutting system, laser drilling system, or grinding system. In some embodiments, the manufacturing system comprises one or more of a welding system, arc welding system, oxy-acetylene gas welding system, methylacetylene propadiene welding system, oxyhydrogen welding system, resistance welding system, projection welding system, seam welding system, ultrasonic welding system, diffusion welding system, friction welding system, electron beam welding system, laser welding system, thermite welding system, induction welding system, solvent welding system, magnetic pulse welding system, radio frequency welding system, infrared welding system, vacuum welding system, brazing system, soldering system, sintering system, adhesive bonding system, or fastening system. In some embodiments, the manufacturing system comprises one or more of a three-dimensional (3D) printing system, direct metal laser sintering system, filament winding system, fused deposition modeling system, selective laser sintering system, spark plasma sintering system, or stereolithography system.

In some embodiments, the payload comprises a metrology system. In some embodiments, the payload comprises a positioning system. In some embodiments, the payload comprises a robotic hand gripper, which grips a work.

In some embodiments, the payload comprises an optical system. In some embodiments, the optical system comprises a laser system. In some embodiments, the optical system comprising an optical manufacturing system. In some embodiments, the optical manufacturing system comprises a laser manufacturing system.

In some embodiments, the optical system comprises one or more light sources. In some embodiments, the optical system comprises one or more light emitting diodes (LEDs). In some embodiments, the optical system comprises one or more lasers. In some embodiments, the lasers comprise one or more continuous wave lasers. In some embodiments, the lasers comprise one or more pulsed lasers. In some embodiments, the lasers comprise one or more gas lasers, such as one or more helium-neon (HeNe) lasers, argon (Ar) lasers, krypton (Kr) lasers, xenon (Xe) ion lasers, nitrogen ($N_2$) lasers, carbon dioxide ($CO_2$) lasers, carbon monoxide (CO) lasers, transversely excited atmospheric (TEA) lasers, or excimer lasers. For instance, the lasers may comprise one or more argon dimer ($Ar_2$) excimer lasers, krypton dimer ($Kr_2$) excimer lasers, fluorine dimer ($F_2$) excimer lasers, xenon dimer ($Xe_2$) excimer lasers, argon fluoride (ArF) excimer lasers, krypton chloride (KrCl) excimer lasers, krypton fluoride (KrF) excimer lasers, xenon bromide (XeBr) excimer lasers, xenon chloride (XeCl) excimer lasers, or xenon fluoride (XeF) excimer lasers. In some embodiments, the laser comprise one or more dye lasers.

In some embodiments, the lasers comprise one or more metal-vapor lasers, such as one or more helium-cadmium (HeCd) metal-vapor lasers, helium-mercury (HeHg) metal-vapor lasers, helium-selenium (HeSe) metal-vapor lasers, helium-silver (HeAg) metal-vapor lasers, strontium (Sr) metal-vapor lasers, neon-copper (NeCu) metal-vapor lasers, copper (Cu) metal-vapor lasers, gold (Au) metal-vapor lasers, manganese (Mn) metal-vapor laser, or manganese chloride ($MnCl_2$) metal-vapor lasers.

In some embodiments, the lasers comprise one or more solid-state lasers, such as one or more ruby lasers, metal-doped crystal lasers, or metal-doped fiber lasers. For instance, the lasers may comprise one or more neodymium-doped yttrium aluminum garnet (Nd:YAG) lasers, neodymium/chromium doped yttrium aluminum garnet (Nd/Cr:YAG) lasers, erbium-doped yttrium aluminum garnet (Er:YAG) lasers, neodymium-doped yttrium lithium fluoride (Nd:YLF) lasers, neodymium-doped yttrium orthovanadate (ND:$YVO_4$) lasers, neodymium-doped yttrium calcium oxoborate (Nd:YCOB) lasers, neodymium glass (Nd:glass) lasers, titanium sapphire (Ti:sapphire) lasers, thulium-doped yttrium aluminum garnet (Tm:YAG) lasers, ytterbium-doped yttrium aluminum garnet (Yb:YAG) lasers, ytterbium-doped glass (Yt:glass) lasers, holmium yttrium aluminum garnet (Ho:YAG) lasers, chromium-doped zinc selenide (Cr:ZnSe) lasers, cerium-doped lithium strontium aluminum fluoride (Ce:LiSAF) lasers, cerium-doped lithium calcium aluminum fluoride (Ce:LiCAF) lasers, erbium-doped glass (Er:glass) lasers, erbium-ytterbium-codoped glass (Er/Yt:glass) lasers, uranium-doped calcium fluoride (U:$CaF_2$) lasers, or samarium-doped calcium fluoride (Sm:$CaF_2$) lasers.

In some embodiments, the lasers comprise one or more semiconductor lasers or diode lasers, such as one or more gallium nitride (GaN) lasers, indium gallium nitride (InGaN) lasers, aluminum gallium indium phosphide (AlGaInP) lasers, aluminum gallium arsenide (AlGaAs) lasers, indium gallium arsenic phosphide (InGaAsP) lasers, vertical cavity surface emitting lasers (VCSELs), or quantum cascade lasers.

In some embodiments, the lasers emit continuous wave laser light. In some embodiments, the lasers emit pulsed laser light. In some embodiments, the lasers have a pulse length of at least about 1 femtoseconds (fs), 2 fs, 3 fs, 4 fs, 5 fs, 6 fs, 7 fs, 8 fs, 9 fs, 10 fs, 20 fs, 30 fs, 40 fs, 50 fs, 60 fs, 70 fs, 80 fs, 90 fs, 100 fs, 200 fs, 300 fs, 400 fs, 500 fs, 600 fs, 700 fs, 800 fs, 900 fs, 1 picosecond (ps), 2 ps, 3 ps, 4 ps, 5 ps, 6 ps, 7 ps, 8 ps, 9 ps, 10 ps, 20 ps, 30 ps, 40 ps, 50 ps, 60 ps, 70 ps, 80 ps, 90 ps, 100 ps, 200 ps, 300 ps, 400 ps, 500 ps, 600 ps, 700 ps, 800 ps, 900 ps, 1 nanosecond (ns), 2 ns, 3 ns, 4 ns, 5 ns, 6 ns, 7 ns, 8 ns, 9 ns, 10 ns, 20 ns, 30 ns, 40 ns, 50 ns, 60 ns, 70 ns, 80 ns, 90 ns, 100 ns, 200 ns, 300 ns, 400 ns, 500 ns, 600 ns, 700 ns, 800 ns, 900 ns, 1,000 ns, or more. In some embodiments, the lasers have a pulse length of at most about 1,000 ns, 900 ns, 800 ns, 700 ns, 600 ns, 500 ns, 400 ns, 300 ns, 200 ns, 100 ns, 90 ns, 80 ns, 70 ns, 60 ns, 50 ns, 40 ns, 30 ns, 20 ns, 10 ns, 9 ns, 8 ns, 7 ns, 6 ns, 5 ns, 4 ns, 3 ns, 2 ns, 1 ns, 900 ps, 800 ps, 700 ps, 600 ps, 500 ps, 400 ps, 300 ps, 200 ps, 100 ps, 90 ps, 80 ps, 70 ps, 60 ps, 50 ps, 40 ps, 30 ps, 20 ps, 10 ps, 9 ps, 8 ps, 7 ps, 6 ps, 5 ps, 4 ps, 3 ps, 2 ps, 1 ps, 900 fs, 800 fs, 700 fs, 600 fs, 500 fs, 400 fs, 300 fs, 200 fs, 100 fs, 90 fs, 80 fs, 70 fs, 60 fs, 50 fs, 40 fs, 30 fs, 20 fs, 10 fs, 9 fs, 8 fs, 7 fs, 6 fs, 5 fs, 4 fs, 3 fs, 2 fs, 1 fs, or less. In some embodiments, the lasers have a pulse length that is within a range defined by any two of the preceding values.

In some embodiments, the lasers have a repetition rate of at least about 1 hertz (Hz), 2 Hz, 3 Hz, 4 Hz, 5 Hz, 6 Hz, 7 Hz, 8 Hz, 9 Hz, 10 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, 1 kilohertz (kHz), 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, 200 kHz, 300 kHz, 400 kHz, 500 kHz, 600 kHz, 700 kHz, 800 kHz, 900 kHz, 1 megahertz (MHz), 2 MHz, 3 MHz, 4 MHz, 5 MHz, 6 MHz, 7 MHz, 8 MHz, 9 MHz, 10 MHz, 20 MHz, 30 MHz, 40 MHz, 50 MHz, 60 MHz, 70 MHz, 80 MHz, 90 MHz, 100 MHz, 200 MHz, 300 MHz, 400 MHz, 500 MHz, 600 MHz, 700 MHz, 800 MHz, 900 MHz, 1,000 MHz, or more. In some embodiments, the lasers have a repetition rate of at most about 1,000 MHz, 900 MHz, 800 MHz, 700 MHz, 600 MHz, 500 MHz, 400 MHz, 300 MHz, 200 MHz, 100 MHz, 90 MHz, 80 MHz, 70 MHz, 60 MHz, 50 MHz, 40 MHz, 30 MHz, 20 MHz, 10 MHz, 9 MHz, 8 MHz, 7 MHz, 6 MHz, 5 MHz, 4 MHz, 3 MHz, 2 MHz, 1 MHz, 900 kHz, 800 kHz, 700 kHz, 600 kHz, 500 kHz, 400 kHz, 300 kHz, 200 kHz, 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, 900 Hz, 800 Hz, 700 Hz, 600 Hz, 500 Hz, 400 Hz, 300 Hz, 200 Hz, 100 Hz, 90 Hz, 80 Hz, 70 Hz, 60 Hz, 50 Hz, 40 Hz, 30 Hz, 20 Hz, 10 Hz, 9 Hz, 8 Hz, 7 Hz, 6 Hz, 5 Hz, 4 Hz, 3 Hz, 2 Hz, 1 Hz, or less. In some embodiments, the lasers have a repetition rate that is within a range defined by any two of the preceding values.

In some embodiments, the lasers emit light having a pulse energy of at least about 1 nanojoule (nJ), 2 nJ, 3 nJ, 4 nJ, 5 nJ, 6 nJ, 7 nJ, 8 nJ, 9 nJ, 10 nJ, 20 nJ, 30 nJ, 40 nJ, 50 nJ, 60 nJ, 70 nJ, 80 nJ, 90 nJ, 100 nJ, 200 nJ, 300 nJ, 400 nJ, 500 nJ, 600 nJ, 700 nJ, 800 nJ, 900 nJ, 1 microjoule (μJ), 2 μJ, 3 μJ, 4 μJ, 5 μJ, 6 μJ, 7 μJ, 8 μJ, 9 μJ, 10 μJ, 20 μJ, 30 μJ, 40 μJ, 50 μJ, 60 μJ, 70 μJ, 80 μJ, 90 μJ, 100 μJ, 200 μJ, 300 μJ, 400 μJ, 500 μJ, 600 μJ, 700 μJ, 800 μJ, 900 μJ, a least 1 millijoule (mJ), 2 mJ, 3 mJ, 4 mJ, 5 mJ, 6 mJ, 7 mJ, 8 mJ, 9 mJ, 10 mJ, 20 mJ, 30 mJ, 40 mJ, 50 mJ, 60 mJ, 70 mJ, 80 mJ, 90 mJ, 100 mJ, 200 mJ, 300 mJ, 400 mJ, 500 mJ, 600 mJ, 700 mJ, 800 mJ, 900 mJ, a least 1 Joule (J), or more. In some embodiments, the lasers emit light having a pulse energy of at most about 1 J, 900 mJ, 800 mJ, 700 mJ, 600 mJ, 500 mJ, 400 mJ, 300 mJ, 200 mJ, 100 mJ, 90 mJ, 80 mJ, 70 mJ, 60 mJ, 50 mJ, 40 mJ, 30 mJ, 20 mJ, 10 mJ, 9 mJ, 8 mJ, 7 mJ, 6 mJ, 5 mJ, 4 mJ, 3 mJ, 2 mJ, 1 mJ, 900 μJ, 800 μJ, 700 μJ, 600 μJ, 500 μJ, 400 μJ, 300 μJ, 200 μJ, 100 μJ, 90 μJ, 80 μJ, 70 μJ, 60 μJ, 50 μJ, 40 μJ, 30 μJ, 20 μJ, 10 μJ, 9 μJ, 8 μJ, 7 μJ, 6 μJ, 5 μJ, 4 μJ, 3 μJ, 2 μJ, 1 μJ, 900 nJ, 800 nJ, 700 nJ, 600 nJ, 500 nJ, 400 nJ, 300 nJ, 200 nJ, 100 nJ, 90 nJ, 80 nJ, 70 nJ, 60 nJ, 50 nJ, 40 nJ, 30 nJ, 20 nJ, 10 nJ, 9 nJ, 8 nJ, 7 nJ, 6 nJ, 5 nJ, 4 nJ, 3 nJ, 2 nJ, 1 nJ, or less. In some embodiments, the lasers emit light having a pulse energy that is within a range defined by any two of the preceding values.

In some embodiments, the LEDs or lasers emit light having an average power of at least about 1 microwatt (μV), 2 μW, 3 μW, 4 μW, 5 μW, 6 μW, 7 μW, 8 μW, 9 μW, 10 μW, 20 μW, 30 μW, 40 μW, 50 μW, 60 μW, 70 μW, 80 μW, 90 μW, 100 μW, 200 μW, 300 μW, 400 μW, 500 μW, 600 μW, 700 μW, 800 μW, 900 μW, 1 milliwatt (mW), 2 mW, 3 mW, 4 mW, 5 mW, 6 mW, 7 mW, 8 mW, 9 mW, 10 mW, 20 mW, 30 mW, 40 mW, 50 mW, 60 mW, 70 mW, 80 mW, 90 mW, 100 mW, 200 mW, 300 mW, 400 mW, 500 mW, 600 mW, 700 mW, 800 mW, 900 mW, 1 watt (W), 2 W, 3 W, 4 W, 5 W, 6 W, 7 W, 8 W, 9 W, 10 W, 20 W, 30 W, 40 W, 50 W, 60 W, 70 W, 80 W, 90 W, 100 W, 200 W, 300 W, 400 W, 500 W, 600 W, 700 W, 800 W, 900 W, 1,000 W, or more. In some embodiments, the LEDs or lasers emit light having an average power of at most about 1,000 W, 900 W, 800 W, 700 W, 600 W, 500 W, 400 W, 300 W, 200 W, 100 W, 90 W, 80 W, 70 W, 60 W, 50 W, 40 W, 30 W, 20 W, 10 W, 9 W, 8 W, 7 W, 6 W, 5 W, 4 W, 3 W, 2 W, 1 W, 900 mW, 800 mW, 700 mW, 600 mW, 500 mW, 400 mW, 300 mW, 200 mW, 100 mW, 90 mW, 80 mW, 70 mW, 60 mW, 50 mW, 40 mW, 30 mW, 20 mW, 10 mW, 9 mW, 8 mW, 7 mW, 6 mW, 5 mW, 4 mW, 3 mW, 2 mW, 1 mW, 900 μW, 800 μW, 700 μW, 600 μW, 500 μW, 400 μW, 300 μW, 200 μW, 100 μW, 90 μW, 80 μW, 70 μW, 60 μW, 50 μW, 40 μW, 30 μW, 20 μW, 10 μW, 9 μW, 8 μW, 7 μW, 6 μW, 5 μW, 4 μW, 3 μW, 2 μW, 1 μW, or more. In some embodiments, the LEDs or lasers emit light having a power that is within a range defined by any two of the preceding values.

In some embodiments, the LEDs or lasers emit light comprising one or more wavelengths in the ultraviolet (UV), visible, or infrared (IR) portions of the electromagnetic spectrum. In some embodiments, the LEDs or lasers emit light comprising one or more wavelengths of at least about 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1,000 nm, 1,010 nm, 1,020 nm, 1,030 nm, 1,040 nm, 1,050 nm, 1,060 nm, 1,070 nm, 1,080 nm, 1,090 nm, 1,100 nm, 1,110 nm, 1,120 nm, 1,130 nm, 1,140 nm, 1,150 nm, 1,160 nm, 1,170 nm, 1,180 nm, 1,190 nm, 1,200 nm, 1,210 nm, 1,220 nm, 1,230 nm, 1,240 nm, 1,250 nm, 1,260 nm, 1,270 nm, 1,280 nm, 1,290 nm, 1,300 nm, 1,310 nm, 1,320 nm, 1,330 nm, 1,340 nm, 1,350 nm, 1,360 nm, 1,370 nm, 1,380 nm, 1,390 nm, 1,400 nm, or more. In some embodiments, the LEDs or lasers emit light comprising one or more wavelengths of at most about 1,400 nm, 1,390 nm, 1,380 nm, 1,370 n, 1,360 nm, 1,350 nm, 1,340 nm, 1,330 nm, 1,320 nm, 1,310 nm, 1,300 nm, 1,290 nm, 1,280 nm, 1,270 n, 1,260 nm, 1,250 nm, 1,240 nm, 1,230 nm, 1,220 nm, 1,210 nm, 1,200 nm, 1,190 nm, 1,180 nm, 1,170 n, 1,160 nm, 1,150 nm, 1,140 nm, 1,130 nm, 1,120 nm, 1,110 nm, 1,100 nm, 1,090 nm, 1,080 nm, 1,070 n, 1,060 nm, 1,050 nm, 1,040 nm, 1,030 nm, 1,020 nm, 1,010 nm, 1,000 nm, 990 nm, 980 nm, 970 nm, 960 nm, 950 nm, 940 nm, 930 nm, 920 nm, 910 nm, 900 nm, 890 nm, 880 nm, 870 nm, 860 nm, 850 nm, 840 nm, 830 nm, 820 nm, 810 nm, 800 nm, 790 nm, 780 nm, 770 nm, 760 nm, 750 nm, 740 nm, 730 nm, 720 nm, 710 nm, 700 nm, 690 nm, 680 nm, 670 nm, 660 nm, 650 nm, 640 nm, 630 nm, 620 nm, 610 nm, 600 nm, 590 nm, 580 nm, 570 nm, 560 nm, 550 nm, 540 nm, 530 nm, 520 nm, 510 nm, 500 nm, 490 nm, 480 nm, 470 nm, 460 nm, 450 nm, 440 nm, 430 nm, 420 nm, 410 nm, 400 nm, 390 nm, 380 nm, 370 nm, 360 nm, 350 nm, 340 nm, 330 nm, 320 nm, 310 nm, 300 nm, 290 nm, 280 nm, 270 nm, 260 nm, 250 nm, 240 nm, 230 nm, 220 nm, 210 nm, 200 nm. In some embodiments, the LEDs or lasers emit light comprising one or more wavelengths that are within a range defined by any two of the preceding values.

In some embodiments, the lasers emit light having a bandwidth of at least about $1\times10^{-15}$ nm, $2\times10^{-15}$ nm, $3\times10^{-15}$ nm, $4\times10^{-15}$ nm, $5\times10^{-15}$ nm, $6\times10^{-15}$ nm, $7\times10^{-15}$ nm, $8\times10^{-15}$ nm, $9\times10^{-15}$ nm, $1\times10^{-14}$ nm, $2\times10^{-14}$ nm, $3\times10^{-14}$ nm, $4\times10^{-14}$ nm, $5\times10^{-14}$ nm, $6\times10^{-14}$ nm, $7\times10^{-14}$ nm, $8\times10^{-14}$ nm, $9\times10^{-14}$ nm, $1\times10^{-13}$ nm, $2\times10^{-13}$ nm, $3\times10^{-13}$ nm, $4\times10^{-13}$ nm, $5\times10^{-13}$ nm, $6\times10^{-13}$ nm, $7\times10^{-13}$ nm, $8\times10^{-13}$ nm, $9\times10^{-13}$ nm, $1\times10^{-12}$ nm, $2\times10^{-12}$ nm, $3\times10^{-12}$ nm, $4\times10^{-12}$ nm, $5\times10^{-12}$ nm, $6\times10^{-12}$ nm, $7\times10^{-12}$ nm, $8\times10^{-12}$ nm, $9\times10^{-12}$ nm, $1\times10^{-11}$ nm, $2\times10^{-11}$ nm, $3\times10^{-11}$ nm, $4\times10^{-11}$ nm, $5\times10^{-11}$ nm, $6\times10^{-11}$ nm, $7\times10^{-11}$ nm, $8\times10^{-11}$ nm, $9\times10^{-11}$ nm, $1\times10^{-10}$ nm, $2\times10^{-10}$ nm, $3\times10^{-10}$ nm, $4\times10^{-10}$ nm, $5\times10^{-10}$ nm, $6\times10^{-10}$ nm, $7\times10^{-10}$ nm, $8\times10^{-10}$ nm, $9\times10^{-10}$ nm, $1\times10^{-9}$ nm, $2\times10^{-9}$ nm, $3\times10^{-9}$ nm, $4\times10^{-9}$ nm, $5\times10^{-9}$ nm, $6\times10^{-9}$ nm, $7\times10^{-9}$ nm, $8\times10^{-9}$ nm, $9\times10^{-9}$ nm, $1\times10^{-8}$ nm, $2\times10^{-8}$ nm, $3\times10^{-8}$ nm, $4\times10^{-8}$ nm, $5\times10^{-8}$ nm, $6\times10^{-8}$ nm, $7\times10^{-8}$ nm, $8\times10^{-8}$ nm, $9\times10^{-8}$ nm, $1\times10^{-7}$ nm, $2\times10^{-7}$ nm, $3\times10^{-7}$ nm, $4\times10^{-7}$ nm, $5\times10^{-7}$ nm, $6\times10^{-7}$ nm, $7\times10^{-7}$ nm, $8\times10^{-7}$ nm, $9\times10^{-7}$ nm, $1\times10^{-6}$ nm, $2\times10^{-6}$ nm, $3\times10^{-6}$ nm, $4\times10^{-6}$ nm, $5\times10^{-6}$ nm, $6\times10^{-6}$ nm, $7\times10^{-6}$ nm, $8\times10^{-6}$ nm, $9\times10^{-6}$ nm, $1\times10^{-5}$ nm, $2\times10^{-5}$ nm, $3\times10^{-5}$ nm, $4\times10^{-5}$ nm, $5\times10^{-5}$ nm, $6\times10^{-5}$ nm, $7\times10^{-5}$ nm, $8\times10^{-5}$ nm, $9\times10^{-5}$ nm, $1\times10^{-4}$ nm, $2\times10^{-4}$ nm, $3\times10^{-4}$ nm, $4\times10^{-4}$ nm, $5\times10^{-4}$ nm, $6\times10^{-4}$ nm, $7\times10^{-4}$ nm, $8\times10^{-4}$ nm, $9\times10^{-4}$ nm, $1\times10^{-3}$ nm, or more. In some embodiments, the lasers emit light having a bandwidth of at most about $1\times10^{-3}$ nm, $9\times10^{-4}$ nm, $8\times10^{-4}$ nm, $7\times10^{-4}$ nm, $6\times10^{-4}$ nm, $5\times10^{-4}$ nm, $4\times10^{-4}$ nm, $3\times10^{-4}$ nm, $2\times10^{-4}$ nm, $1\times10^{-4}$ nm, $9\times10^{-5}$ nm, $8\times10^{-5}$ nm, $7\times10^{-5}$ nm, $6\times10^{-5}$ nm, $5\times10^{-5}$ nm, $4\times10^{-5}$ nm, $3\times10^{-5}$ nm, $2\times10^{-5}$ nm, $1\times10^{-5}$ nm, $9\times10^{-6}$ nm, $8\times10^{-6}$ nm, $7\times10^{-6}$ nm, $6\times10^{-6}$ nm, $5\times10^{-6}$ nm, $4\times10^{-6}$ nm, $3\times10^{-6}$ nm, $2\times10^{-6}$ nm, $1\times10^{-6}$ nm, $9\times10^{-7}$ nm, $8\times10^{-7}$ nm, $7\times10^{-7}$ nm, $6\times10^{-7}$ nm, $5\times10^{-7}$ nm, $4\times10^{-7}$ nm, $3\times10^{-7}$ nm, $2\times10^{-7}$ nm, $1\times10^{-7}$ nm, $9\times10^{-8}$ nm, $8\times10^{-8}$ nm, $7\times10^{-8}$ nm, $6\times10^{-8}$ nm, $5\times10^{-8}$ nm, $4\times10^{-8}$ nm, $3\times10^{-8}$ nm, $2\times10^{-8}$ nm, $1\times10^{-8}$ nm, $9\times10^{-9}$ nm, $8\times10^{-9}$ nm, $7\times10^{-9}$ nm, $6\times10^{-9}$ nm, $5\times10^{-9}$ nm, $4\times10^{-9}$ nm, $3\times10^{-9}$ nm, $2\times10^{-9}$ nm, $1\times10^{-9}$ nm, $9\times10^{-10}$ nm, $8\times10^{-10}$ nm, $7\times10^{-10}$ nm, $6\times10^{-10}$ nm, $5\times10^{-10}$ nm, $4\times10^{-10}$ nm, $3\times10^{-10}$ nm, $2\times10^{-10}$ nm, $1\times10^{-10}$ nm, $9\times10^{-11}$ nm, $8\times10^{-11}$ nm, $7\times10^{-11}$ nm, $6\times10^{-11}$ nm, $5\times10^{-11}$ nm, $4\times10^{-11}$ nm, $3\times10^{-11}$ nm, $2\times10^{-11}$ nm, $1\times10^{-11}$ nm, $9\times10^{-12}$ nm, $8\times10^{-12}$ nm, $7\times10^{-12}$ nm, $6\times10^{-12}$ nm, $5\times10^{-12}$ nm, $4\times10^{-12}$ nm, $3\times10^{-12}$ nm, $2\times10^{-12}$ nm, $1\times10^{-12}$ nm, $9\times10^{-13}$ nm, $8\times10^{-13}$ nm, $7\times10^{-13}$ nm, $6\times10^{-13}$ nm, $5\times10^{-13}$ nm, $4\times10^{-13}$ nm, $3\times10^{-13}$ nm, $2\times10^{-13}$ nm, $1\times10^{-13}$ nm, $9\times10^{-14}$ nm, $8\times10^{-14}$ nm, $7\times10^{-14}$ nm, $6\times10^{-14}$ nm, $5\times10^{-14}$ nm, $4\times10^{-14}$ nm, $3\times10^{-14}$ nm, $2\times10^{-14}$ nm, $1\times10^{-14}$ nm, $9\times10^{-15}$ nm, $8\times10^{-15}$ nm, $7\times10^{-15}$ nm, $6\times10^{-15}$ nm, $5\times10^{-15}$ nm, $4\times10^{-15}$ nm, $3\times10^{-15}$ nm, $2\times10^{-15}$ nm, $1\times10^{-15}$ nm, or less. In some embodiments, the lasers emit light having a bandwidth that is within a range defined by any two of the preceding values.

In some embodiments, the optical system comprises one or more acousto-optic modulators, attenuators, beamsplitters, depolarizers, diaphragms, diffractive beamsplitters, diffractive lenses, diffusers, electro-optic modulators, lenses, mirrors, multifocal diffractive lenses, nanophotonic resonators, nullers, optical circulators, optical isolators, optical cavities, optical microcavities, photonic integrated circuits, pinholes, polarizers, prims, q-plates, retroreflectors, spatial filters, spatial light modulators, waveguides, wave plates, or zone plates.

In some embodiments, the optical system comprises one or more microscopes. Examples of microscopes include, but are not limited to, optical microscopes, fluorescence microscopes, super resolution microscopes, confocal microscopes, scanning confocal microscopes, structured illumination microscopes, saturated structured illumination microscopes, spatially modulated illumination microscopes, near-field optical random mapping (NORM) microscopes, stochastic optical reconstruction microscopes (STORMs), ground state depletion (GSD) microscopes, spectral precision distance microscopes (SPDMs), photo-activated localization microscopes (PALMs), fluorescence PALMs, super-resolution optical fluctuation imaging (SOFI) microscopes, 4-pi microscopes, phase-contrast microscopes, stimulated emission depletion (STED) microscopes, near-field scanning microscopes, electron microscopes, scanning electron microscopes, transmission electron microscopes, scanning tunneling microscopes, atomic force microscopes, and scanning probe microscopes.

In some embodiments, the optical system comprises one or more telescopes. Examples of telescopes include, but are not limited to, optical telescopes, reflecting telescope, refracting telescopes, catadioptric telescopes, Newtonian telescopes, Dobsonian telescopes, Cassegrain telescopes, Argunov-Cassegrain telescopes, Kelvtsov-Cassegrain telescopes, Maksutov telescopes, Maksutov-Cassegrain telescopes, Keplerian telescopes, Dall-Kirkham telescopes, Nasmyth telescopes, Ritchey-Chrétien telescopes, Gregorian telescopes, Herschelian telescopes, gamma ray telescopes, x-ray telescopes, visible radiation telescopes, infrared telescopes, and interferometric telescopes.

In some embodiments, one or more components of the optical system described herein may be remote from, but optically coupled to, the payload. For instance, one or more components of the optical system (such as one or more laser sources or other light sources described herein) may be located at some distance from the payload, but optically coupled to the payload using one or more optical fibers, light pipes, optical waveguides, or free-space optical communications elements.

In some embodiments, the vibration dampening module comprises at least one active vibration dampener 132 and at least one passive vibration dampener 134.

In some embodiments, the passive and/or active vibration dampeners may be arranged to improve the vibrational isolation performance in differing ranges of frequencies. Such arrangements may allow the system to provide enhanced performance across a broader range of frequencies than would be achievable using a passive or an active vibration dampener alone.

In some embodiments, the passive vibration dampener may be arranged to dampen high frequency motions outside of the useful range of the active vibration dampener In some embodiments, the passive vibration dampener may be arranged to dampen motions where the rate-of-change of the acceleration (commonly called "shock" or "jerk") may cause damage to the active vibration dampener and/or induce undesirable vibrations in the system.

In some embodiments, the passive vibration dampener may be connected in series between the active vibration dampener and the payload (for instance, as illustrated in FIG. 1). Such embodiments may improve the vibration isolation. The passive vibration dampener may be configured to reduce undesirable dynamics using known engineering methods.

Figure 2:
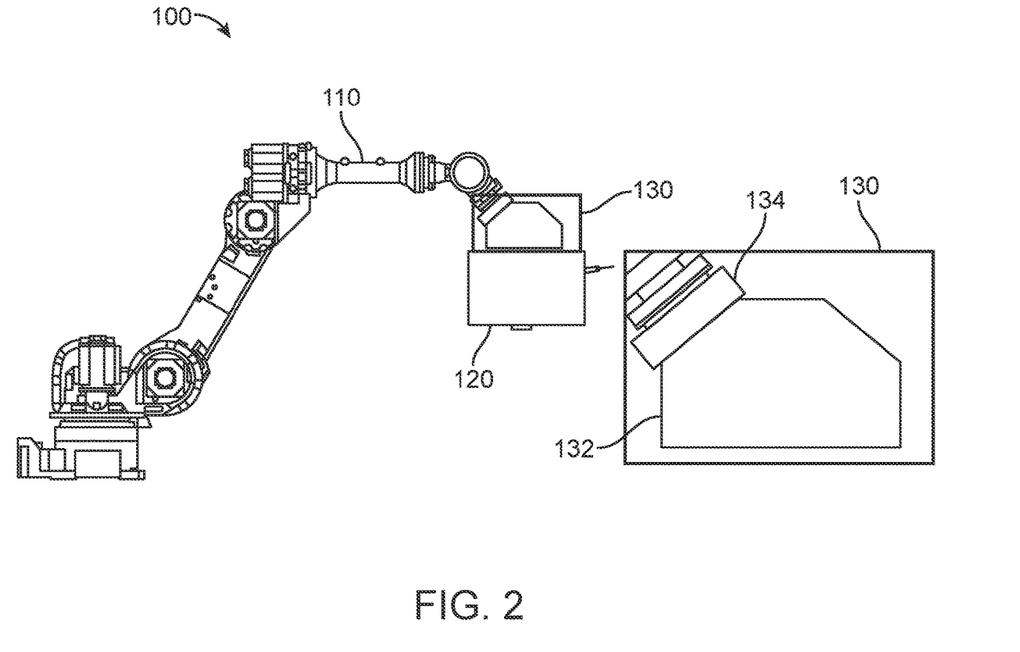
FIG. 2 shows a block diagram of a second embodiment of a system for reducing mechanical disturbances.

In some embodiments, the passive vibration dampener may be connected in series between the mechanical positioner and the active element (for instance as illustrated in FIG. 2). Such embodiments may improve the vibration isolation. The passive vibration dampener may be configured to reduce undesirable dynamics using known engineering methods.

In some embodiments, the passive vibration dampener may be connected in series between the mechanical positioning system and the active vibration dampener, and a second passive vibration dampener may be connected in series between the active vibration dampener and the payload (not illustrated). Such embodiments may further improve the vibration isolation. The passive vibration dampener may be configured to reduce undesirable dynamics using known engineering methods.

In some embodiments, the active vibration dampener is configured to dampen vibrations of the payload that are characterized by a characteristic frequency of at least about 1 Hertz (Hz), 2 Hz, 3 Hz, 4 Hz, 5 Hz, 6 Hz, 7 Hz, 8 Hz, 9 Hz, 10 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, 1 kHz, 2 kHz, 3 kHz, 4 kHz, 5 kHz, 6 kHz, 7 kHz, 8 kHz, 9 kHz, 10 kHz, 20 kHz, 30 kHz, 40 kHz, 50 kHz, 60 kHz, 70 kHz, 80 kHz, 90 kHz, 100 kHz, or more. In some embodiments, the active vibration dampener is configured to dampen vibrations of the payload that are characterized by a characteristic frequency of at most about 100 kHz, 90 kHz, 80 kHz, 70 kHz, 60 kHz, 50 kHz, 40 kHz, 30 kHz, 20 kHz, 10 kHz, 9 kHz, 8 kHz, 7 kHz, 6 kHz, 5 kHz, 4 kHz, 3 kHz, 2 kHz, 1 kHz, 900 Hz, 800 Hz, 700 Hz, 600 Hz, 500 Hz, 400 Hz, 300 Hz, 200 Hz, 100 Hz, 90 Hz, 80 Hz, 70 Hz, 60 Hz, 50 Hz, 40 Hz, 30 Hz, 20 Hz, 10 Hz, 9 Hz, 8 Hz, 7 Hz, 6 Hz, 5 Hz, 4 Hz, 3 Hz, 2 Hz, 1 Hz, or less. In some embodiments, the active vibration dampener is configured to dampen vibrations of the payload that are characterized by a characteristic frequency that is within a range defined by any two of the preceding values. For example, in some embodiments, the active vibration dampener is configured to dampen vibrations of the payload that are characterized by a characteristic frequency between about 30 Hz and about 30 kHz.

In some embodiments, the active vibration dampener is configured to dampen vibrations of the payload at the characteristic frequency by at least about 1 decibels (dB), 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, 26 dB, 27 dB, 28 dB, 29 dB, 30 dB, 31 dB, 32 dB, 33 dB, 34 dB, 35 dB, 36 dB, 37 dB, 38 dB, 39 dB, 40 dB, 41 dB, 42 dB, 43 dB, 44 dB, 45 dB, 46 dB, 47 dB, 48 dB, 49 dB, 50 dB, or more. In some embodiments, the active vibration dampener is configured to dampen vibrations of the payload at the characteristic frequency by at most about 50 dB, 49 dB, 48 dB, 47 dB, 46 dB, 45 dB, 44 dB, 43 dB, 42 dB, 41 dB, 40 dB, 39 dB, 38 dB, 37 dB, 36 dB, 35 dB, 34 dB, 33 dB, 32 dB, 31 dB, 30 dB, 29 dB, 28 dB, 27 dB, 26 dB, 25 dB, 24 dB, 23 dB, 22 dB, 21 dB, 20 dB, 19 dB, 18 dB, 17 dB, 16 dB, 15 dB, 14 dB, 13 dB, 12 dB, 11 dB, 10 dB, 9 dB, 8 dB, 7 dB, 6 dB, 5 dB, 4 dB, 3 dB, 2 dB, 1 dB, or less. In some embodiments, the active vibration dampener is configured to dampen vibrations of the payload at the characteristic frequency by a value that is within a ranged defined by any two of the preceding values.

In some embodiments, the active vibration dampener comprises at least one piezoelectric actuator. Piezoelectric actuators may apply a force along one single specific direction in reaction to an electric excitation. In some embodiments, a single unidirectional piezoelectric actuator may be used to dampen vibrations in one specific direction, thereby forming a one degree-of-freedom (DOF) piezoelectric actuator or one-axis piezoelectric actuator. In some embodiments, the one-axis piezoelectric actuator may act in a direction aligned with gravity, where a majority of ground-based vibrational disturbances may occur. In some embodiments, the one-axis piezoelectric actuator may act in a direction aligned with some specific criteria of payload performance. In some embodiments, two unidirectional piezoelectric actuators may operate in two different directions, forming a two DOF piezoelectric actuator or two-axis piezoelectric actuator. In some embodiments, three unidirectional piezoelectric actuators may operate in three different directions, forming a three DOF piezoelectric actuator or three-axis piezoelectric actuator. In some embodiments, four unidirectional piezoelectric actuators may operate in four different directions, forming a four DOF piezoelectric actuator or four-axis piezoelectric actuator. In some embodiments, five unidirectional piezoelectric actuators may operate in five different directions, forming a five DOF piezoelectric actuator or five-axis piezoelectric actuator. In some embodiments, six unidirectional piezoelectric actuators may operate in six different directions, forming a six DOF piezoelectric actuator or six-axis piezoelectric actuator.

In some embodiments, the piezoelectric actuator comprises one or more members selected from the group consisting of: crystalline piezoelectric actuators, ceramic piezoelectric actuators, polymeric piezoelectric actuators, perovskite piezoelectric actuators, lead zirconate titanate piezoelectric actuators, barium titanate piezoelectric actuators, lead titanate piezoelectric actuators, gallium nitride piezoelectric actuators, zinc oxide piezoelectric actuators, polyvinylidene fluoride piezoelectric actuators, polyvinylidene difluoride piezoelectric actuators, langasite piezoelectric actuators, bismuth sodium titanate piezoelectric actuators, bismuth potassium titanate piezoelectric actuators, potassium niobite piezoelectric actuators, potassium sodium niobite piezoelectric actuators, and any combination or composite thereof.

Piezoelectric actuators may rapidly apply a large force in reaction to an electric excitation but typically may only apply a limited displacement magnitude. As such, they may be well-suited for isolation from fast, small-magnitude vibrational disturbance motions centered about a central position. Low frequency vibrations may involve larger displacements, which may be accounted for utilizing the passive vibration dampeners described herein.

In some embodiments, the stiff response characteristics of piezoelectric actuators may cause the payload to generally follow a prescribed motion of the mechanical positioning system with a lower piezoelectric actuator power consumption than may be otherwise achievable. In some embodiments, this may cause the payload to follow the mechanical positioning system in the non-actuated direction of the active vibration dampener.

In some embodiments, the active vibration dampener is coupled to the mechanical positioning system, as shown in FIG. 1. In some embodiments, the active vibration dampener is coupled to the payload, as shown in FIG. 2.

In some embodiments, the system further comprises one or more sensors (not shown in FIG. 1 or FIG. 2) configured to measure one or more dynamical properties associated with the payload and/or the mechanical positioning system and one or more controllers configured to receive the one or more dynamical properties and to direct the active vibration dampener to compensate for vibrations of the payload and/or the mechanical positioning system based on the one or more dynamical properties. In this manner, the sensors and the active vibration dampener may act in a negative feedback loop to actively dampen vibrations. In some embodiments, the sensors comprise one or more members selected from the group consisting of: position sensors, velocity sensors, accelerometers, force sensors, and torque sensors. In some embodiments, the controller comprises a centralized or distributed system. In some embodiments, the controller includes, for example, a central processing unit (CPU) and electronic memory. In some embodiments, the controller functions as a device that controls the operation of the active vibration dampener by the CPU executing one or more computer programs stored in the electronic memory. In some embodiments, the controller is disposed inside the vibration dampening module. In some embodiments, the controller is not disposed inside the vibration dampening module but is arranged as a server or the like outside the vibration dampening module. In such cases, the control and the vibration dampening module may be connected via a communication line such as a wired communications line (cable communications), a wireless communications line, or a network. In some embodiments, each processing and function included in the program may be executed by program software that can be executed by a computer, or processing of each part may be executed by hardware such as a predetermined gate array (FPGA), ASIC, or program software, and a partial hardware module that realizes a part of hardware elements may be implemented in a mixed form.

In some embodiments, the passive vibration dampener 134 is configured to dampen vibrations of the payload that are characterized by a characteristic frequency of at least about 1 Hz, 2 Hz, 3 Hz, 4 Hz, 5 Hz, 6 Hz, 7 Hz, 8 Hz, 9 Hz, 10 Hz, 20 Hz, 30 Hz, 40 Hz, 50 Hz, 60 Hz, 70 Hz, 80 Hz, 90 Hz, 100 Hz, 200 Hz, 300 Hz, 400 Hz, 500 Hz, 600 Hz, 700 Hz, 800 Hz, 900 Hz, 1 kHz, or more. In some embodiments, the passive vibration dampener is configured to dampen vibrations of the payload that are characterized by a characteristic frequency of at most about 1 kHz, 900 Hz, 800 Hz, 700 Hz, 600 Hz, 500 Hz, 400 Hz, 300 Hz, 200 Hz, 100 Hz, 90 Hz, 80 Hz, 70 Hz, 60 Hz, 50 Hz, 40 Hz, 30 Hz, 20 Hz, 10 Hz, 9 Hz, 8 Hz, 7 Hz, 6 Hz, 5 Hz, 4 Hz, 3 Hz, 2 Hz, 1 Hz, or less. In some embodiments, passive active vibration dampener is configured to dampen vibrations of the payload that are characterized by a characteristic frequency that is within a range defined by any two of the preceding values. In some embodiments, the active vibration dampener is configured to dampen vibrations having a characteristic frequency that is more than a characteristic frequency of vibrations which the passive vibration dampener is configured to dampen.

In some embodiments, the passive vibration dampener is configured to dampen vibrations of the payload at the characteristic frequency by at least about 1 decibels (dB), 2 dB, 3 dB, 4 dB, 5 dB, 6 dB, 7 dB, 8 dB, 9 dB, 10 dB, 11 dB, 12 dB, 13 dB, 14 dB, 15 dB, 16 dB, 17 dB, 18 dB, 19 dB, 20 dB, 21 dB, 22 dB, 23 dB, 24 dB, 25 dB, 26 dB, 27 dB, 28 dB, 29 dB, 30 dB, 31 dB, 32 dB, 33 dB, 34 dB, 35 dB, 36 dB, 37 dB, 38 dB, 39 dB, 40 dB, 41 dB, 42 dB, 43 dB, 44 dB, 45 dB, 46 dB, 47 dB, 48 dB, 49 dB, 50 dB, or more. In some embodiments, the passive vibration dampener is configured to dampen vibrations of the payload at the characteristic frequency by at most about 50 dB, 49 dB, 48 dB, 47 dB, 46 dB, 45 dB, 44 dB, 43 dB, 42 dB, 41 dB, 40 dB, 39 dB, 38 dB, 37 dB, 36 dB, 35 dB, 34 dB, 33 dB, 32 dB, 31 dB, 30 dB, 29 dB, 28 dB, 27 dB, 26 dB, 25 dB, 24 dB, 23 dB, 22 dB, 21 dB, 20 dB, 19 dB, 18 dB, 17 dB, 16 dB, 15 dB, 14 dB, 13 dB, 12 dB, 11 dB, 10 dB, 9 dB, 8 dB, 7 dB, 6 dB, 5 dB, 4 dB, 3 dB, 2 dB, 1 dB, or less. In some embodiments, the passive vibration dampener is configured to dampen vibrations of the payload at the characteristic frequency by a value that is within a ranged defined by any two of the preceding values.

In some embodiments, the passive vibration dampener comprises an elastomeric material. In some embodiments, the elastomeric material comprises one or more materials selected from the group consisting of: organic elastomers, organosilicon elastomers, rubbers, unsaturated rubbers, saturated rubbers, polyisoprene, cis-1,4,-polyisoprene, tran-1,4-polyisoprene, polybutadiene, chloropene, polychloropene, neoprene, Baypren, butyl rubbers, isobutene isoprene copolymers, halogenated butyl rubbers, chloro butyl rubbers, bromo butyl rubbers, styrene-butadiene rubbers, styrene butadiene copolymers, nitrile rubbers, butadiene acrylonitrile copolymers, hydrogenated nitrile rubbers, Therban, Zetpol, ethylene propylene rubbers, ethene propene copolymers, epichlorohydrin rubbers, polyacrylic rubbers, silicone rubbers, fluorosilicone rubbers, fluorelastomers, Viton, Tecnoflon, Fluorel, Aflas, Dai-El, perfluoroelastomers, Tecnoflon, Kalrez, Chemraz, Perlast, polyether block amides, chlorosulfonated polyethylene, Hypalon, ethylene-vinyl acetate, and any combination or composite thereof. In some embodiments, the passive vibration dampener comprises a semi-active actuator.

In some embodiments, the passive vibration dampener is coupled to the payload, as shown in FIG. 1. In some embodiments, the passive vibration dampener is coupled to the mechanical positioning system, as shown in FIG. 2.

In the absence of the vibration dampening module, the positioning or alignment errors associated with the mechanical positioning system would carry through to the payload, subjecting the payload to its own positioning and/or alignment errors due to vibrational or other environmental disturbances. The vibration dampening module may be used to correct for these positioning and/or alignment errors, allowing the use of the payload in situations requiring fine control over positioning and/or alignment.

FIG. 2 shows a block diagram of a second embodiment of a system 200 for reducing mechanical disturbances. In the example shown, the system 100 comprises a mechanical positioning system 110, a payload 120, a vibration dampening module 130, an active vibration dampener 132, and a passive vibration dampener 134. The mechanical positioning system, payload, vibration dampening module, active vibration dampener, and passive vibration dampener may be similar to the mechanical positioning system, payload, vibration dampening module, active vibration dampener, and passive vibration dampener described herein with respect to FIG. 1.

An advantage of the embodiment as shown in FIG. 2 can be seen in cases where a high degree of robot vibration—relative to the inertial mass of the payload and payload-based vibrations—is absorbed by the passive isolator—thus reducing the effort the active vibration system has to mitigate to the robot vibration transmission to the payload. Conversely, there are situations—such as low robot vibrations or high payload vibrations relative to the inertial mass of the payload—where the embodiment as shown in FIG. 1 can provide better isolation or tracking performance.

Figure 3:
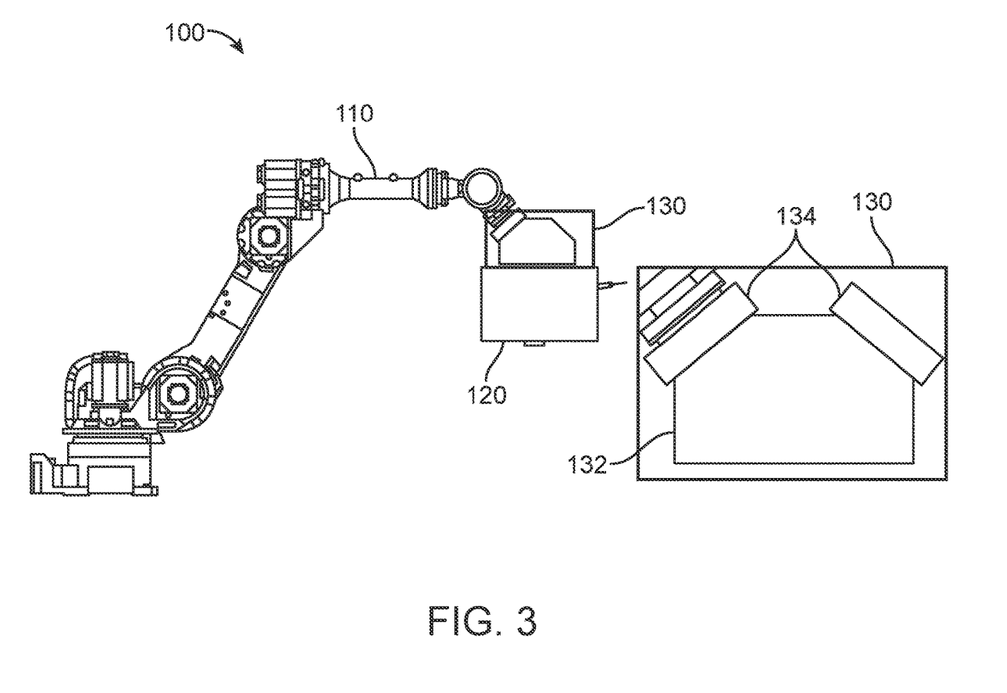
FIG. 3 shows a block diagram of a third embodiment of a system for reducing mechanical disturbances.

In some embodiments, the passive vibration dampener is coupled to the payload and to the mechanical positioning system, as shown in FIG. 3.

Figure 4:
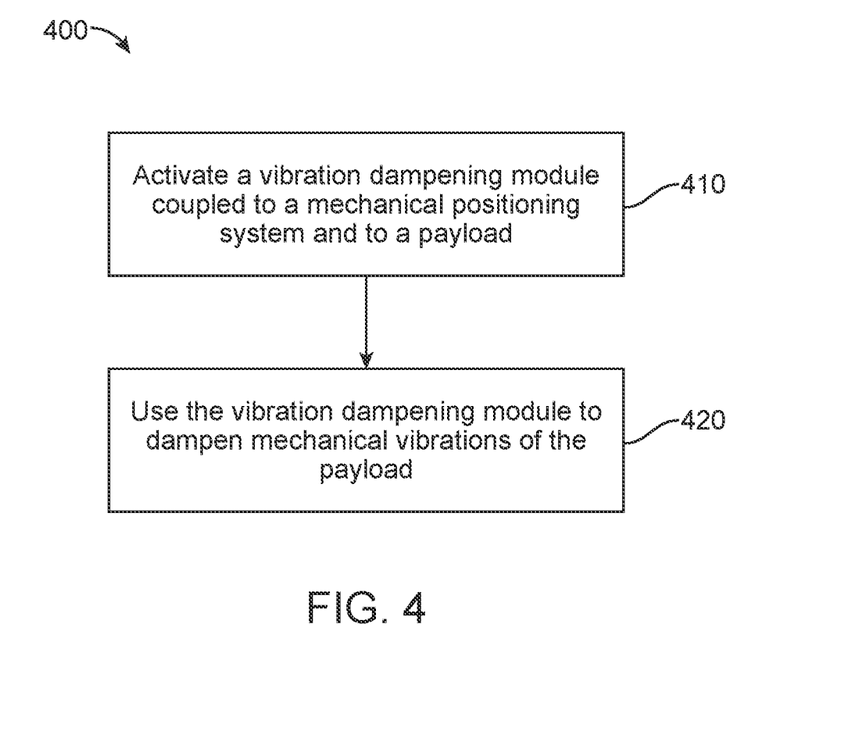
FIG. 4 shows a flowchart depicting an exemplary method for reducing vibrational disturbances.

FIG. 4 shows a flowchart depicting an exemplary method 400 for reducing mechanical disturbances. In the example shown, a vibration dampening module coupled to a mechanical positioning system and/or to a payload is activated at 410. The vibration dampening module, mechanical positioning system, and payload may comprise any vibration dampening module, mechanical positioning system, and payload described herein (for instance, with respect to FIG. 1, FIG. 2, or FIG. 3).

In some embodiments, the vibration dampening module is used to dampen mechanical vibrations of the payload at 420.

In some embodiments, the method further comprises coupling the vibration dampening module to the mechanical positioning system and the payload prior to activating the vibration dampening module.

In some embodiments, as described herein, the vibration dampening module comprises at least one of an active vibration dampener and a passive vibration dampener. In some embodiments, the mechanical positioning system comprises a robotic system. In some embodiments, the robotic system comprises a robotic arm. In some embodiments, the payload comprises an optical system. In some embodiments, the optical system comprises a laser system. In some embodiments, the optical system comprises an optical manufacturing system. In some embodiments, the optical manufacturing system comprises a laser manufacturing system. In some embodiments, the payload comprises a manufacturing system. In some embodiments, the payload comprises a positioning system. In some embodiments, the payload comprises a robotic hand gripper.

In some embodiments, the method further comprises dampening vibrations of the payload characterized by a characteristic frequency of 30 Hz to 30 kHz. In some embodiments, the active vibration dampener is used to dampen vibrations of the payload characterized by a characteristic frequency of 30 Hz to 30 kHz. In some embodiments, the active vibration dampener comprises a piezoelectric actuator. In some embodiments, the piezoelectric actuator comprises one or more members selected from the group consisting of: a one-axis piezoelectric actuator, a two-axis piezoelectric actuator, a three-axis piezoelectric actuator, a four-axis piezoelectric actuator, a five-axis piezoelectric actuator, and a six-axis piezoelectric actuator.

In some embodiments, the method further comprises dampening vibrations of the payload characterized by a characteristic frequency of at most 300 Hz. In some embodiments, the passive vibration dampener is used to dampen vibrations of the payload characterized by a characteristic frequency of at most 300 Hz. In some embodiments, the passive vibration dampener comprises an elastomeric material. In some embodiments, the active vibration dampener is coupled to the mechanical positioning system and the passive vibration dampener is coupled to the payload. In some embodiments, the active vibration dampener is coupled to the payload and the passive vibration dampener is coupled to the mechanical positioning system.

In some embodiments, the method further comprises: measuring one or more dynamical properties associated with at least one of the mechanical positioning system and the payload; receiving the one or more dynamical properties; and directing the active vibration dampener to compensate for vibrations of at least one of the mechanical positioning system and the payload based on the one or more dynamical properties. In some embodiments, one or more sensors are used to measure the one or more dynamical properties associated with at least one of the mechanical positioning system and the payload and one or more controllers are used to receive the one or more dynamical properties and direct the active vibration dampener to compensate for vibrations of at least one of the mechanical positioning system and the payload based on the one or more dynamical properties. In some embodiments, the one or more sensors comprise one or more members selected from the group consisting of: position sensors, velocity sensors, accelerometers, force sensors, and torque sensors.

Figure 5:
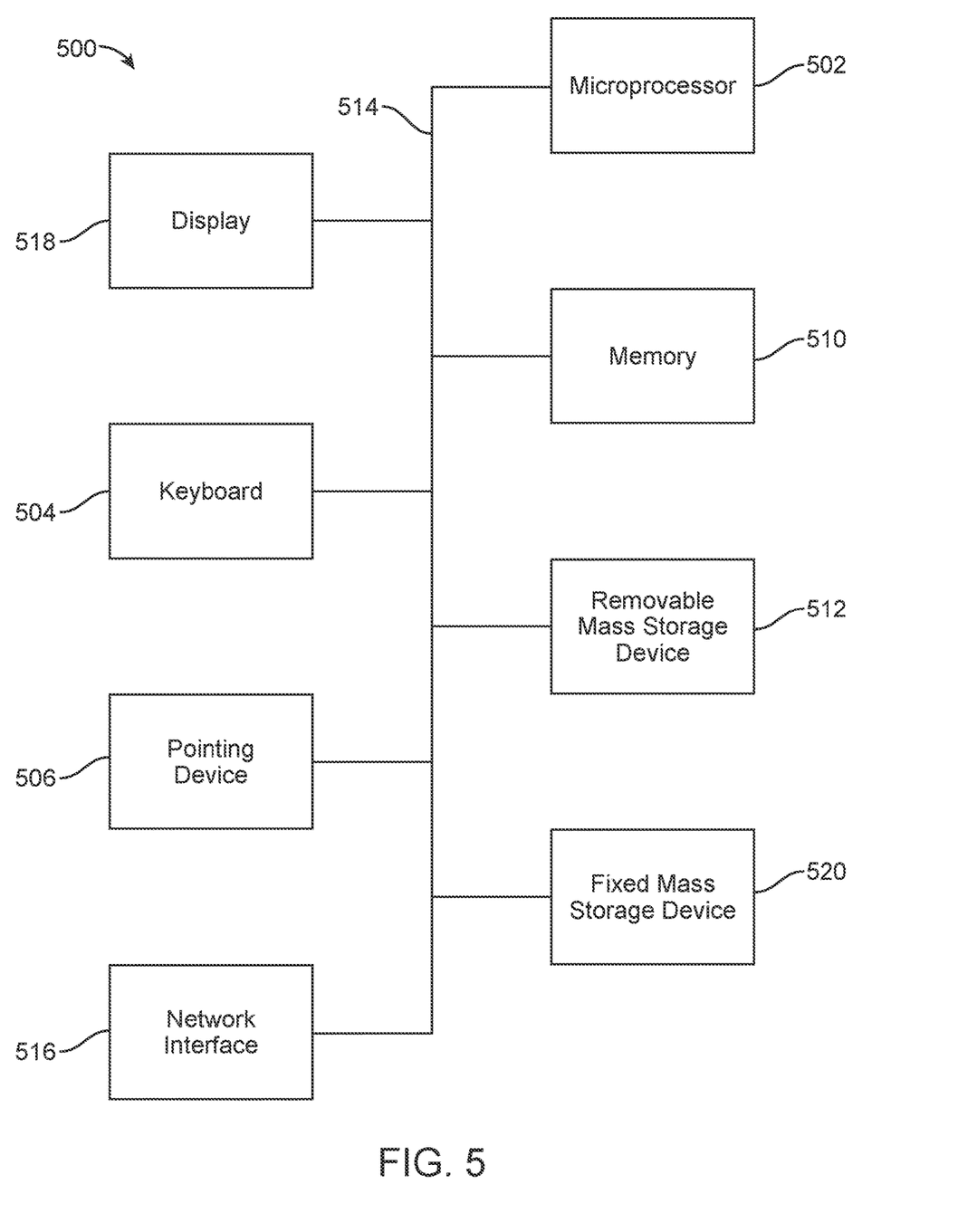
FIG. 5 shows a block diagram of a computer system for reducing vibrational disturbances.

FIG. 5 is a block diagram of a computer system 500 used in some embodiments to perform methods for reducing mechanical disturbances described herein (such as method 400 as described herein with respect to FIG. 4). FIG. 5 illustrates one embodiment of a general-purpose computer system. Other computer system architectures and configurations can be used for carrying out the processing of the present invention. Computer system 500, made up of various subsystems described below, includes at least one microprocessor subsystem 502. In some embodiments, the microprocessor subsystem comprises at least one central processing unit (CPU) or graphical processing unit (GPU). The microprocessor subsystem can be implemented by a single-chip processor or by multiple processors. In some embodiments, the microprocessor subsystem is a general-purpose digital processor which controls the operation of the computer system 500. Using instructions retrieved from memory 510, the microprocessor subsystem controls the reception and manipulation of input data, and the output and display of data on output devices.

The microprocessor subsystem 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on microprocessor subsystem. Also as well known in the art, primary storage typically includes basic operating instructions, program code, data and objects used by the microprocessor subsystem to perform its functions. Primary storage devices 510 may include any suitable computer-readable storage media, described below, depending on whether, for example, data access needs to be bi-directional or uni-directional. The microprocessor subsystem 502 can also directly and very rapidly retrieve and store frequently needed data in a cache memory (not shown in FIG. 5).

A removable mass storage device 512 provides additional data storage capacity for the computer system 500, and is coupled either bi-directionally (read/write) or uni-directionally (read only) to microprocessor subsystem 502. Storage 512 may also include computer-readable media such as magnetic tape, flash memory, signals embodied on a carrier wave, PC-CARDS, portable mass storage devices, holographic storage devices, and other storage devices. A fixed mass storage 520 can also provide additional data storage capacity. The most common example of mass storage 520 is a hard disk drive. Mass storage 512 and 520 generally store additional programming instructions, data, and the like that typically are not in active use by the processing subsystem. It will be appreciated that the information retained within mass storage 512 and 520 may be incorporated, if needed, in standard fashion as part of primary storage 410 (e.g. RAM) as virtual memory.

In addition to providing processing subsystem 502 access to storage subsystems, bus 514 can be used to provide access to other subsystems and devices as well. In the described embodiment, these can include a display monitor 518, a network interface 516, a keyboard 504, and a pointing device 506, as well as an auxiliary input/output device interface, a sound card, speakers, and other subsystems as needed. The pointing device 506 may be a mouse, stylus, track ball, or tablet, and is useful for interacting with a graphical user interface.

The network interface 516 allows the processing subsystem 502 to be coupled to another computer, computer network, or telecommunications network using a network connection as shown. Through the network interface 516, it is contemplated that the processing subsystem 502 might receive information, e.g., data objects or program instructions, from another network, or might output information to another network in the course of performing the above-described method steps. Information, often represented as a sequence of instructions to be executed on a processing subsystem, may be received from and outputted to another network, for example, in the form of a computer data signal embodied in a carrier wave. An interface card or similar device and appropriate software implemented by processing subsystem 502 can be used to connect the computer system 500 to an external network and transfer data according to standard protocols. That is, method embodiments of the present invention may execute solely upon processing subsystem 502, or may be performed across a network such as the Internet, intranet networks, or local area networks, in conjunction with a remote processing subsystem that shares a portion of the processing. Additional mass storage devices (not shown in FIG. 5) may also be connected to processing subsystem 502 through network interface 516.

An auxiliary I/O device interface (not shown in FIG. 5) can be used in conjunction with computer system 500. The auxiliary I/O device interface can include general and customized interfaces that allow the processing subsystem 502 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 5 is but an example of a computer system suitable for use with the invention. Other computer systems suitable for use with the invention may include additional or fewer subsystems. In addition, bus 514 is illustrative of any interconnection scheme serving to link the subsystems. Other computer architectures having different configurations of subsystems may also be utilized.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system comprising:
   a vibration dampening module,
   wherein the vibration dampening module comprises an active vibration dampener and a passive vibration dampener,
   wherein the vibration dampening module is coupled to a mechanical positioning system and a payload, and
   wherein the vibration dampening module is located between the mechanical positioning system and the payload.

2. The system of claim 1, wherein the mechanical positioning system comprises a robotic system.

3. The system of claim 2, wherein the robotic system comprises a robotic arm.

4. The system of claim 1, wherein the payload comprises an optical system.

5. The system of claim 4, wherein the optical system comprises a laser system.

6. The system of claim 4, wherein the optical system comprises an optical manufacturing system.

7. The system of claim 6, wherein the optical manufacturing system comprises a laser manufacturing system.

8. The system of claim 1, wherein the payload comprises a manufacturing system.

9. The system of claim 1, wherein the payload comprises a metrology system.

10. The system of claim 1, wherein the payload comprises a positioning system.

11. The system of claim 1, wherein the payload comprises a robotic hand gripper.

12. The system of claim 1, wherein the active vibration dampener is configured to dampen vibrations of the payload characterized by a characteristic frequency of 30 Hertz (Hz) to 30 kilohertz (kHz).

13. The system of claim 1, wherein the active vibration dampener comprises a piezoelectric actuator.

14. The system of claim 13, wherein the piezoelectric actuator comprises one or more members selected from the group consisting of: a one-axis piezoelectric actuator, a two-axis piezoelectric actuator, a three-axis piezoelectric actuator, a four-axis piezoelectric actuator, a five-axis piezoelectric actuator, and a six-axis piezoelectric actuator.

15. The system of claim 1, wherein the passive vibration dampener is configured to dampen vibrations of the payload characterized by a characteristic frequency of at most 300 Hz.

16. The system of claim 1, wherein the passive vibration dampener comprises an elastomeric material.

17. The system of claim 1, wherein the active vibration dampener is coupled to the mechanical positioning system and the passive vibration dampener is coupled to the payload.

18. The system of claim 1, wherein the active vibration dampener is coupled to the payload and the passive vibration dampener is coupled to the mechanical positioning system.

19. The system of claim 1, further comprising:
one or more sensors configured to measure one or more dynamical properties associated with at least one of the mechanical positioning system and the payload; and
one or more controllers configured to receive the one or more dynamical properties and to direct the active vibration dampener to compensate for vibrations of at least one of the mechanical positioning system and the payload based on the one or more dynamical properties.

20. The system of claim 19, wherein the one or more sensors comprise one or more members selected from the group consisting of: position sensors, velocity sensors, accelerometers, force sensors, and torque sensors.

\* \* \* \* \*